United States Patent
Slutsky (10) Patent No.: US 9,058,531 B2
(45) Date of Patent: Jun. 16, 2015

(54) IMAGING SCANNER HAVING NEAR FIELD COMMUNICATION DEVICE

(71) Applicant: SYMBOL TECHNOLOGIES, INC., Schaumburg, IL (US)

(72) Inventor: Michael S. Slutsky, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 28 days.

(21) Appl. No.: 13/965,257

(22) Filed: Aug. 13, 2013

(65) Prior Publication Data
US 2015/0048164 A1    Feb. 19, 2015

(51) Int. Cl.
*G06K 7/00* (2006.01)
*G06K 7/10* (2006.01)

(52) U.S. Cl.
CPC .......... *G06K 7/10732* (2013.01); *G06K 7/1096* (2013.01)

(58) Field of Classification Search
USPC ................... 235/462.09, 462.11, 462.13, 440
IPC ............ G06K 7/0004,7/084, 7/1443, 19/06037, G06K 7/10722, 7/14, 17/00, 17/10693
See application file for complete search history.

(56) References Cited

U.S. PATENT DOCUMENTS

| | | | |
|---|---|---|---|
| 6,749,120 B2 | 6/2004 | Hung et al. | |
| 8,146,822 B2 | 4/2012 | Drzymala et al. | |
| 8,201,745 B2 | 6/2012 | Mair | |
| 8,342,407 B2 | 1/2013 | Williams et al. | |
| 8,348,164 B2 | 1/2013 | Nakamura et al. | |
| 2012/0000982 A1 | 1/2012 | Gao et al. | |
| 2012/0187184 A1 | 7/2012 | Challa et al. | |
| 2012/0193429 A1 | 8/2012 | Volkinburg et al. | |
| 2014/0306009 A1* | 10/2014 | LaLinde | 235/440 |

FOREIGN PATENT DOCUMENTS

WO    2012036882 A1    3/2012

* cited by examiner

*Primary Examiner* — Karl D Frech (57) ABSTRACT

Method and apparatus of reading the screen of a mobile computing device. The apparatus is an imaging scanner that includes a NFC device having a NFC antenna. The imaging scanner also includes an illumination system operative to illuminate a target object with illumination light. Under a first condition that no NFC signal from the mobile computing device is received by the NFC device, the illumination system is configured to generate a first illumination light with a first intensity. Under a second condition that the NFC signal from the mobile computing device is received by the NFC device, the illumination system is configured to generate a second illumination light with a second intensity. The second intensity is less than the first intensity.

20 Claims, 5 Drawing Sheets

IMAGING SCANNER HAVING NEAR FIELD COMMUNICATION DEVICE

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

Imaging-based barcode readers may be portable or stationary. A portable barcode reader is one that is adapted to be held in a user's hand and moved with respect to target indicia, such as a target barcode, to be read, that is, imaged and decoded. Stationary barcode readers are mounted in a fixed position, for example, relative to a point-of-sales counter. Target objects, e.g., a product package that includes a target barcode, are moved or swiped past one of the one or more transparent windows and thereby pass within a field of view of the stationary barcode readers. The barcode reader typically provides an audible and/or visual signal to indicate the target barcode has been successfully imaged and decoded. Sometimes barcodes are presented, as opposed to be swiped. This typically happens when the swiped barcode failed to scan, so the operator tries a second time to scan it. Alternately, presentation is done by inexperience users, such as when the reader is installed in a self check out installation.

A typical example where a stationary imaging-based barcode reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target barcode affixed to the target object, i.e., the product or product packaging for the product having the target barcode imprinted or affixed to it. The sales person (or customer in the case of self-service check out) sequentially presents each target object's barcode either to the vertically oriented window or the horizontally oriented window, whichever is more convenient given the specific size and shape of the target object and the position of the barcode on the target object.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A device with one or more Near Field Communication (NFC) antennas includes a housing having a window, an illumination system supported by the housing and operative to illuminate a target object with illumination light directed through the window, and an imaging sensor having an array of photosensitive elements operative to capture an image of the target object during an exposure time period. The device also includes an NFC device being fixed at a position relative to the housing and operative to receive NFC signal from a mobile computing device. The NFC device includes at least one NFC antenna configured to generate a voltage signal from magnetic induction of the NFC signal. The illumination system is operative to generate the illumination light that depends upon at least one of two conditions. Under a first condition that no NFC signal from the mobile computing device is received by the NFC device, the illumination system is configured to generate a first illumination light with a first intensity. Under a second condition that the NFC signal from the mobile computing device is received by the NFC device, the illumination system is (1) configured to generate a second illumination light with a second intensity that is less than the first intensity at least during the exposure time period or (2) disabled from generating a second illumination light at least during the exposure time period.

Figure 1:
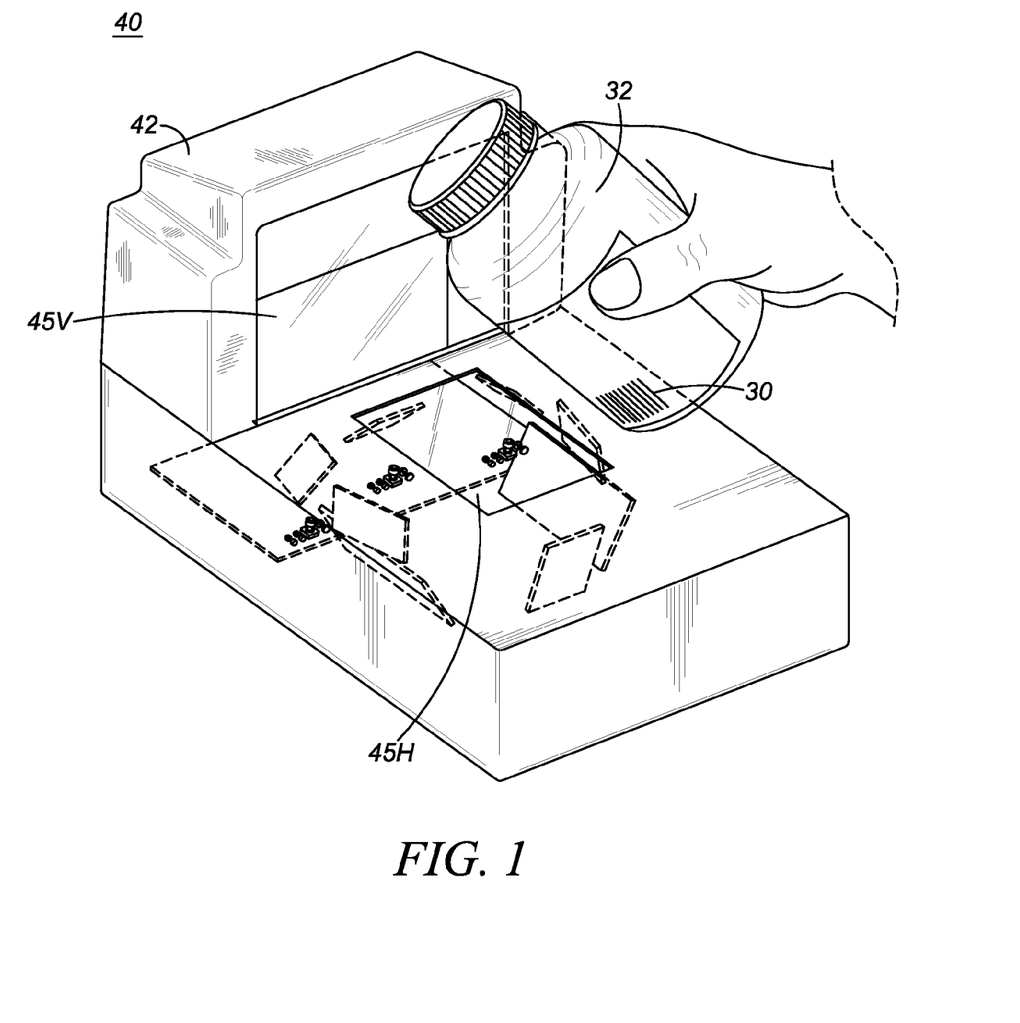
FIG. 1 depicts a workstation in accordance with some embodiments.

FIG. 1 depicts a workstation 40 in accordance with some embodiments. The workstation 40 stationary and includes a housing 42. The housing 42 has a generally horizontal window 45H and a generally vertical window 45V. In one implementation, the housing 42 can be integrated into the sales counter of a point-of-transaction system. The point-of-transaction system can also includes a cash register, a touch screen visual display, a printer for generating sales receipts, or other type user interface. The workstation 40 can be used by retailers to process transactions involving the purchase of products bearing an identifying target, such as UPC symbols.

In accordance with one use, either a sales person or a customer will present a product or target object 32 selected for purchase to the housing 42. More particularly, a target barcode 30 imprinted or affixed to the target object will be presented in a region near the windows 45H and 45V for reading, that is, imaging and decoding of the coded indicia of the target barcode. Upon a successful reading of the target barcode, a visual and/or audible signal will be generated by the workstation 40 to indicate to the user that the target barcode 40 has been successfully imaged and decoded.

Figure 2:
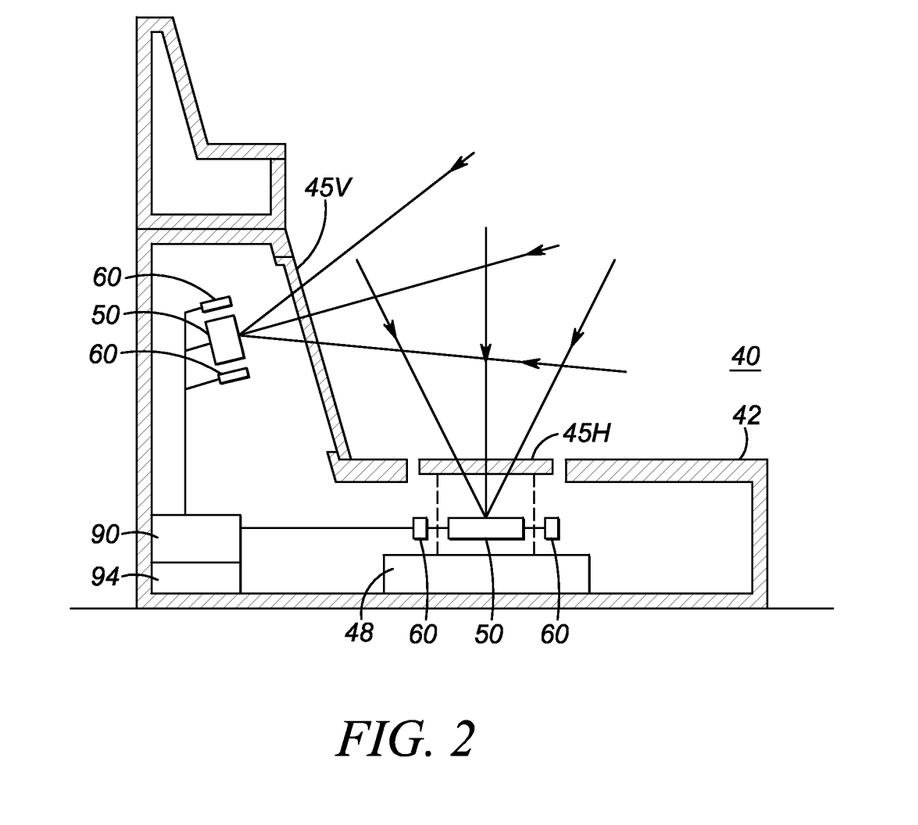
FIG. 2 is a schematic of an imaging scanner in accordance with some embodiments.

As schematically shown in FIG. 2 in accordance with some embodiments, a plurality of imaging sensors 50, each associated with an illuminator 60, are mounted at the workstation 40, for capturing light passing through either or both windows from a target which can be a one- or two-dimensional symbol, such as a two-dimensional symbol on a driver's license, or any document, as described below. The workstation often includes weighing scale 48 incorporated within the housing 42. A horizontal platter 45H is coupled with the weighing scale 48 for weighing a product placed on the horizontal platter 45H.

Each imaging sensor 50 can be a CCD or a CMOS imaging device. The imaging sensor 50 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 50 is operative to detect light through the window 45H or the window 45V for capturing light scattered or reflected from a barcode 30 as pixel data over a two-dimensional imaging field of view (FOV). The imaging sensors 50 and their associated illuminators 60 are operatively connected to a programmed microprocessor or controller 90 operative for controlling the operation of these and other components. Preferably, the microprocessor is the same as the one used for decoding the return light scattered from the target and for processing the captured target images.

In FIG. 2, the controller 90, such as a microprocessor, is operatively connected to the imaging sensor 50, the illuminator 60 for controlling the operation of these components. The controller 90 can also be used to control other devices in the imaging scanner. The imaging scanner 40 can also include a memory 94 that can be accessible by the controller 90 for storing and retrieving data. In many embodiments, the controller 90 also includes a decoder for decoding one or more barcodes that are within the imaging field of view (FOV) of the imaging scanner 40. In some implementations, the barcode 30 can be decoded by digitally processing a captured image of the barcode with a microprocessor.

In some implementation, the imaging scanner 40 can also include an object sensing system. The object sensing system has one or more object light sources for emitting object sensing light, typically infrared (IR) light, and at least one object sensor for sensing the return IR light reflected and/or scattered from the object over an object detection field of view. In some implementation, the illuminator 60 is energized to project the illumination light out of the window 45H or window 45V, only if a target object 32 is detected within the object detection field of view.

FIG. 2 is only a schematic representation of an all imaging sensor-based workstation as embodied in a bi-optical workstation with two windows. The workstation can have other kinds of housings with different shapes. The workstation can have one window, two windows, or with more than two windows. In some embodiments, the workstation can include between one to six imaging sensors. The bi-optical workstation can also include more than six imaging sensors.

In operation, in accordance with some embodiments, the controller 90 sends a command signal to energize the illuminator 60 for a predetermined illumination time period. The controller 90 then exposes the imaging sensor 50 to capture an image of the barcode 30. The captured image of the barcode 30 is transferred to the controller 90 as pixel data. Such pixel data is digitally processed by the decoder in the controller 90 to decode the barcode. The information obtained from decoding the barcode 30 is then stored in the memory 94 or sent to other devices for further processing.

Figure 3:
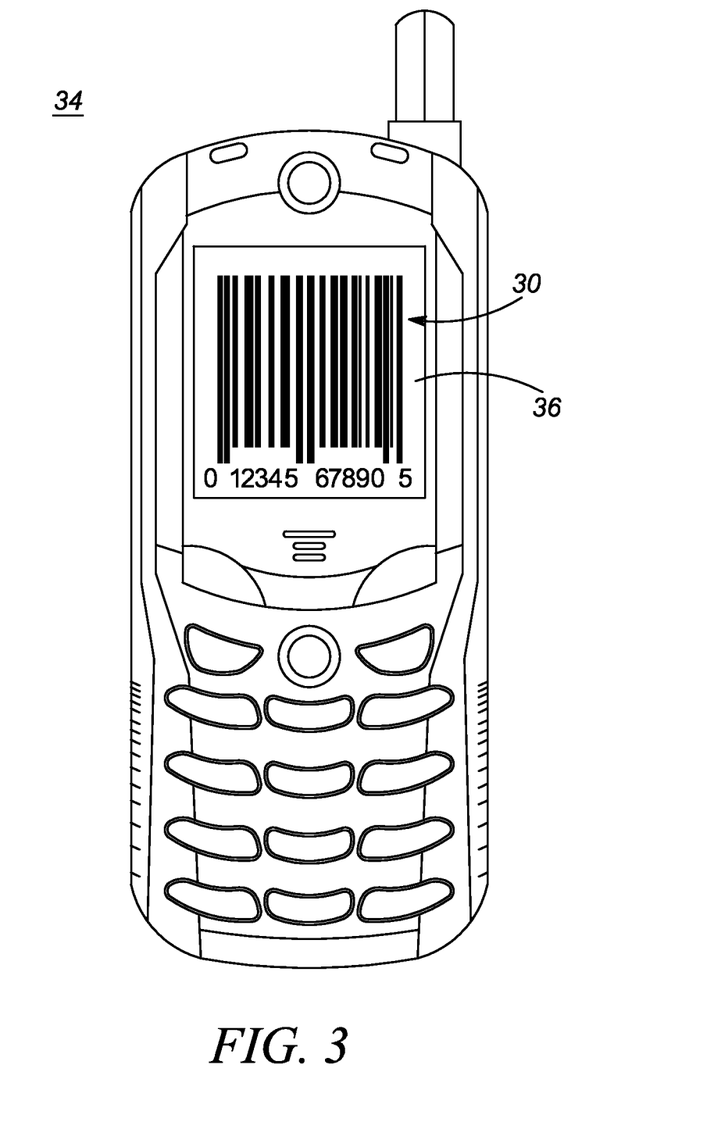
FIG. 3 depicts an example of a mobile electronic device configured as a wireless telephone.

The barcode 30 have typically been printed with ink on such media as paper, foil or film labels directly applied to the products, or directly on paper, foil or film packaging that contain the products, or the printed codes have been printed remotely from the products, such as on membership or customer loyalty cards carried by customers. In recent years, it has become increasingly advantageous to display symbol targets on information display screens, such as display screens of wireless telephones ("cell phones" or "smart phones"), personal digital assistants ("PDAs"), and like mobile electronic devices, including e-readers, portable tablets, slates and computers. Displaying such symbol targets, also known as "electronic codes", on such display screens have become increasingly desirable at such venues as airports and theaters, because they relieve consumers from needing to carry paper coded tickets and coupons. FIG. 3 depicts an example of a mobile electronic device 34 configured as a wireless telephone ("cell phone" or "smart phone") having a display screen on which an electronic code 30 is displayed behind a glass pane or cover 36.

Although generally satisfactory for their intended purpose of reading printed codes, some of the known imaging workstations have not proven to be altogether satisfactory when reading the above-described electronic codes due to specular reflection of the illumination light off the display screens. Display screens can be reflective, i.e., they alter their reflectivity of ambient light to form an image, typically from light and dark pixels, such as passive black and white liquid crystal displays ("LCDs"), or can be emissive, such as backlit LCDs, i.e., they internally generate the light emitted therefrom. Whether reflective or emissive, each display screen includes a glass pane or cover, and the electronic code is displayed behind the glass pane. A portion of the illumination light incident on the glass pane is reflected therefrom back into the reading field of view of the image sensor. This reflected portion of the illumination light creates undesirable one or more hot spots in the reading field of view, at least partially and locally blinds the image sensor, and may significantly compromise reading performance. If the electronic code cannot be successfully read in a first attempt, the scan engine typically tries again and again. Often, the reading fails, and the user must take additional time to manually enter the data that would have otherwise been automatically entered into the workstation.

Accordingly, there is a need for an apparatus for, and a method of, reading both printed and electronic codes with good performance, especially by minimizing, if not eliminating, the deleterious effects of specular reflection of illumination light from a glass pane of a mobile electronic device that is displaying an electronic code.

Figure 4:
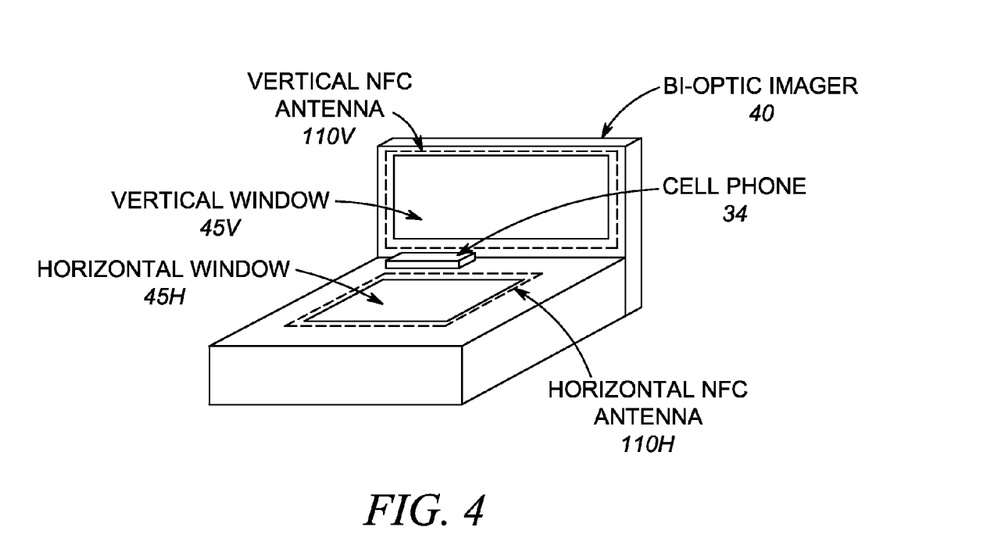
FIG. 4 shows a workstation 40 with one or more Near Field Communication (NFC) antennas in accordance with some embodiments.
Figure 5:
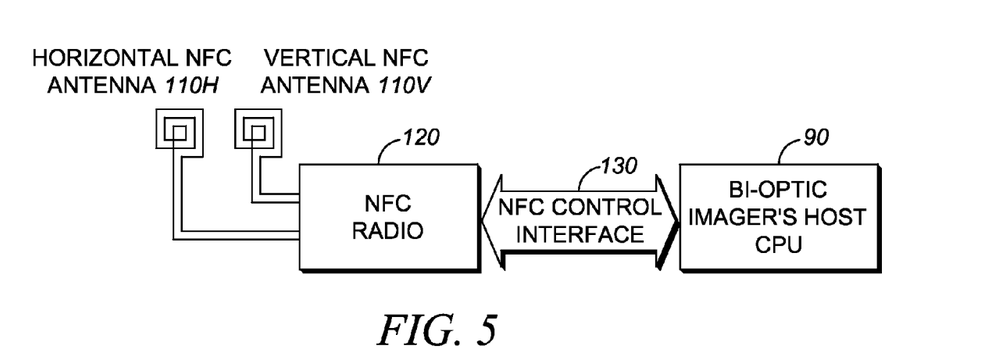
FIG. 5 is a schematic that shows the NFC radio is coupled to the NFC antennas and the controller in accordance with some embodiments.

FIG. 4 shows a workstation 40 with one or more Near Field Communication (NFC) antennas in accordance with some embodiments. The NFC antennas can be used for detecting the presence of a mobile computing device 34 that is presented to or scanned across the windows of the workstation 40. The workstation 40 in FIG. 4 includes a housing 42 having a first window 45V located in an upright plane and having a second window 45H located in a generally horizontal plane that intersects the upright plane. The workstation 40 also includes an NFC device being fixed at a position relative to the housing and operative to receive NFC signal from a mobile computing device 34. The NFC device includes at least one NFC antenna configured to generate a voltage signal from magnetic induction of the NFC signal. For example, in one implementation as shown in FIG. 4, the workstation 40 includes a first NFC antenna 110V mounted behind the first window 45V and a second NFC antenna 110H mounted behind the second window 45H. In another implantation, the workstation 40 have only one NFC antenna, which can be mounted either behind the first window 45V or behind the second window 45H. In one implementation, as shown in FIG. 5, the first NFC antenna 110V and the second NFC antenna 110H are electrically coupled to an NFC radio 120. The NFC radio 120 is coupled to a controller 90 through an NFC Control Interface.

The workstation 40 in FIG. 4 also includes an illumination system supported by the housing and at least one imaging sensor. For example, as shown in FIG. 2, the workstation 40 can include a plurality of imaging sensors 50, each associated with an illuminator 60, and a controller 90. The illumination system in the workstation is operative to illuminate a target object with illumination light directed through one of the windows. The at least one imaging sensor in the workstation 40 has an array of photosensitive elements operative to capture an image of the target object during an exposure time period. The controller in the housing is connected to the at least one imaging sensor and the illumination system. The controller is operative to process a barcode in the image of the target object captured by one of the at least one imaging sensor.

Furthermore, in the workstation 40, the illumination system is operative to generate the illumination light that depends upon at least one of two conditions. Under a first condition that no NFC signal from the mobile computing device is received by the NFC device; the illumination system is configured to generate a first illumination light with a first intensity. Under a second condition that the NFC signal from the mobile computing device is received by the NFC device, the illumination system is (1) configured to generate a second illumination light with a second intensity that is less than the first intensity at least during the exposure time period or (2) disabled from generating a second illumination light at least during the exposure time period. In some implementations, the second intensity associated with the second illumination light is less than 10% of the first intensity associated with the first illumination light at least during the exposure time period. In some implementations, the second intensity associated with the second illumination light with is less than 5% of the first intensity associated with the first illumination light at least during the exposure time period.

In some implementations, the NFC device can include an NFC antenna having conducting coils wounded substantially parallel to one of the windows. In some implementations, the NFC device can include (1) a first NFC antenna having conducting coils wounded substantially parallel to the first window and (2) a second NFC antenna having conducting coils wounded substantially parallel to the second window.

In some implementations, the workstation 40 can also includes an object sensor having an object field of view. Upon detecting the presence of an object within the object field of view of the object sensor, in order to detect the presence of the mobile computing device 34, The NFC device is operative to establish NFC communication the mobile computing device 34.

Figure 6:
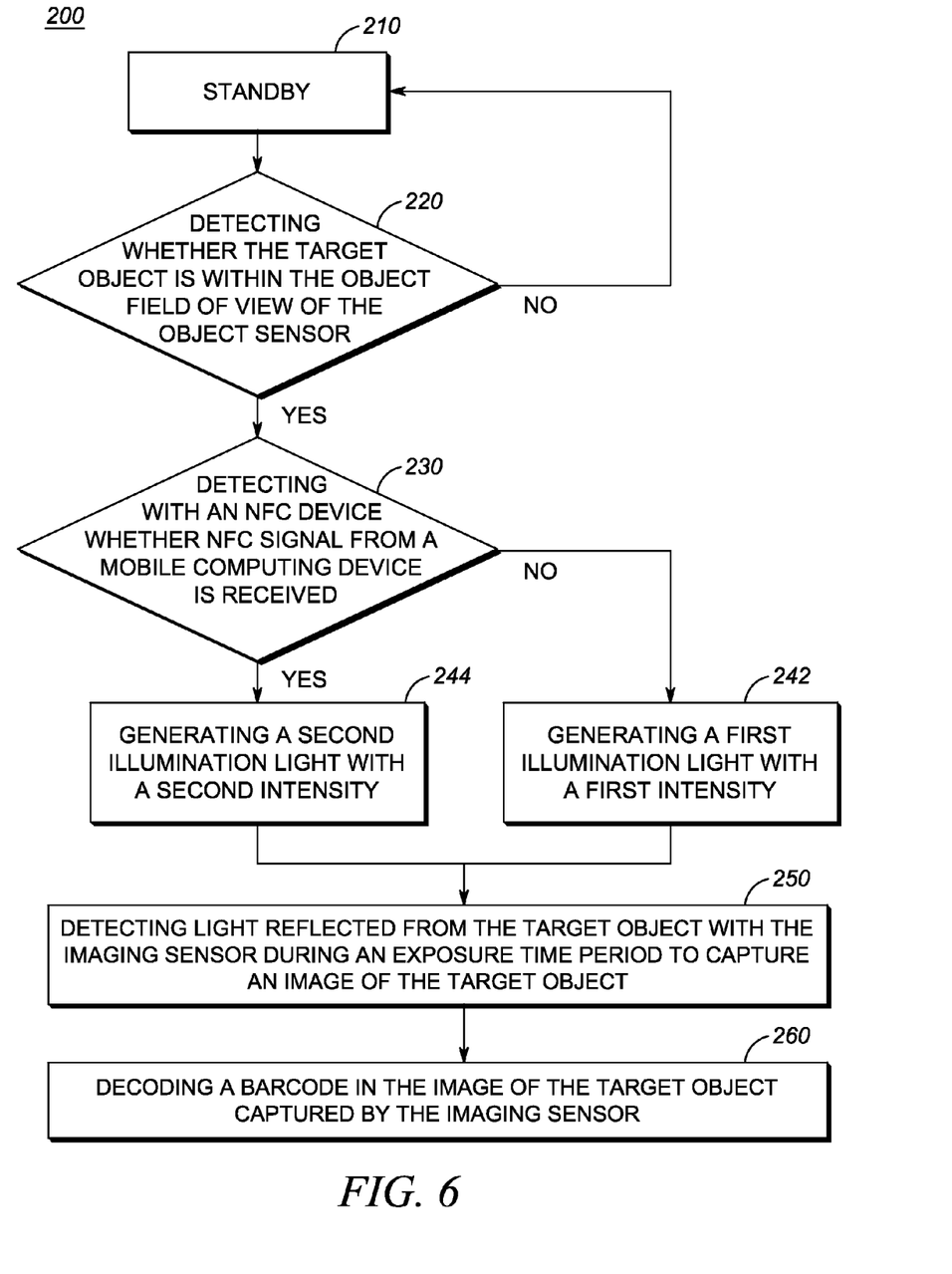
FIG. 6 is a flowchart of a method of operating an imaging scanner that has one or more NFC antennas in accordance with some embodiments.

FIG. 6 is a flowchart of a method 200 of operating an imaging scanner that has one or more Near Field Communication (NFC) antennas in accordance with some embodiments. The method 200 includes block 210, 220, 230, 242, 244, 250, and 260.

At block 210, the imaging scanner is at the standby mode. At block 220, the imaging scanner attempt to detect whether the target object is within the object field of view of the object sensor. If no target object is detected, the imaging scanner maintains at the standby mode. If the target object is detected, at block 230, the imaging scanner attempts to detect, with an NFC device, whether NFC signal from a mobile computing device is received. The imaging scanner subsequently generates an illumination light towards the target object, with the illumination light depending upon whether the NFC signal from the mobile computing device is received, If NFC signal from a mobile computing device is not received, at block 242, the imaging scanner generates a first illumination light with a first intensity. If NFC signal from a mobile computing device is received, at block 244, the imaging scanner generates a second illumination light with a second intensity. After block 242 or block 244, at block 250, the imaging scanner detects light reflected from the target object with the imaging sensor during an exposure time period to capture an image of the target object in memory. Subsequently, at block 260, the imaging scanner processes the image captured by the imaging sensor to decode a barcode in the image captured.

In method 200, the second intensity at block 244 is less than the first intensity at block 242 at least during the exposure time period. In some implementations, the second intensity is set to zero; that is, at block 244, the imaging scanner prevents a second illumination light from being generated at least during the exposure time period. In some implementations, the second intensity associated with the second illumination light is less than 10% of the first intensity associated with the first illumination light at least during the exposure time period. Generally, depending on the level of the intensity of the illumination light generated at block 242 or at block 244, the exposure time period is adjusted accordingly when the imaging sensor is exposed to capture the image of the target object at block 250.

In some implementations, if NFC signal from a mobile computing device is received, the imaging scanner can attempt to establish NFC communication with the mobile computing device. In one example, the imaging scanner can send a command to the mobile computing device to cause a picture of a person be displayed on the mobile computing device, and capture with the imaging sensor the picture displayed on the mobile computing device. In another example, the imaging scanner can send a command to the mobile computing device to change the content of an NFC tag in the NFC device In the foregoing specification, specific embodiments have been described. However, one of ordinary skill in the art appreciates that various modifications and changes can be made without departing from the scope of the invention as set forth in the claims below. For example, the imaging scanner can have one window, two windows, or more than two windows. The imaging scanner can be a workstation, a slot scanner, a flat bed scanner, or a portable scanner. A window of the imaging scanner can be associated with one field of view, two fields of view, three fields of view, or more than three fields of view. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A workstation with one or more Near Field Communication (NFC) antennas comprising:
   a housing having a first window located in an upright plane and having a second window located in a generally horizontal plane that intersects the upright plane;
   an illumination system supported by the housing and operative to illuminate a target object with illumination light directed through one of the windows;
   at least one imaging sensor having an array of photosensitive elements operative to capture an image of the target object during an exposure time period;
   an NFC device being fixed at a position relative to the housing and operative to receive NFC signal from a mobile computing device, the NFC device including at least one NFC antenna configured to generate a voltage signal from magnetic induction of the NFC signal;
   wherein the illumination system is operative to generate the illumination light that depends upon at least one of two conditions;
   wherein, under a first condition that no NFC signal from the mobile computing device is received by the NFC device, the illumination system is configured to generate a first illumination light with a first intensity; and
   wherein, under a second condition that the NFC signal from the mobile computing device is received by the NFC device, the illumination system is (1) configured to generate a second illumination light with a second intensity that is less than the first intensity at least during the exposure time period or (2) disabled from generating a second illumination light at least during the exposure time period.

2. The workstation of claim 1, further comprising:
   a controller in the housing connected to the at least one imaging sensor and the illumination system and operative to process a barcode in the image of the target object captured by one of the at least one imaging sensor.

3. The workstation of claim 1, wherein the NFC device comprises an NFC antenna having conducting coils mounted behind one of the windows.

4. The workstation of claim 1, wherein the NFC device comprises (1) a first NFC antenna mounted behind the first window and (2) a second NFC antenna mounted behind the second window.

5. The workstation of claim 1, wherein the NFC device comprises an NFC antenna having conducting coils wounded substantially parallel to one of the windows.

6. The workstation of claim 1, wherein the NFC device comprises (1) a first NFC antenna having conducting coils wounded substantially parallel to the first window and (2) a second NFC antenna having conducting coils wounded substantially parallel to the second window.

7. The workstation of claim 1, further comprising:
an object sensor having an object field of view; and
wherein the NFC device is operative to establish NFC communication upon detecting the presence of an object within the object field of view of the object sensor.

8. The workstation of claim 1, wherein the second intensity associated with the second illumination light with is less than 10% of the first intensity associated with the first illumination light at least during the exposure time period.

9. The workstation of claim 1, wherein the second intensity associated with the second illumination light with is less than 5% of the first intensity associated with the first illumination light at least during the exposure time period.

10. A method of operating an imaging scanner has an imaging sensor and having one or more Near Field Communication (NFC) antennas, the method comprising:
detecting with an NFC device whether NFC signal from a mobile computing device is received, the NFC device including at least one NFC antenna configured to generate a voltage signal from magnetic induction of the NFC signal
generating an illumination light towards a target object, with the illumination light depending upon whether the NFC signal from the mobile computing device is received,
detecting light reflected from the target object with the imaging sensor during an exposure time period to capture an image of the target object in memory;
processing the image captured by the imaging sensor to decode a barcode in the image captured; and
wherein said generating comprises, under a first condition that no NFC signal from the mobile computing device is received by the NFC device, generating a first illumination light with a first intensity; and
wherein said generating comprises, under a second condition that the NFC signal from the mobile computing device is received by the NFC device, (1) generating a second illumination light with a second intensity that is less than the first intensity at least during the exposure time period or (2) preventing a second illumination light from being generated at least during the exposure time period.

11. The method of claim 10, wherein said imaging scanner includes an object sensor having an object field of view, further comprising:
initiating said detecting whether NFC signal from a mobile computing device is received upon detecting the presence of the target object within the object field of view of the object sensor.

12. The method of claim 10, further comprising:
establishing NFC communication between the NFC device and the mobile computing device.

13. The method of claim 12, further comprising:
sending a command to the mobile computing device to cause a picture of a person be displayed on the mobile computing device; and
capturing with the imaging sensor the picture displayed on the mobile computing device.

14. The method of claim 12, further comprising:
sending a command to the mobile computing device to change the content of an NFC tag in the NFC device.

15. The method of claim 10, wherein the second intensity associated with the second illumination light is less than 10% of the first intensity associated with the first illumination light at least during the exposure time period.

16. A device with one or more Near Field Communication (NFC) antennas comprising:
a housing having a window;
an illumination system supported by the housing and operative to illuminate a target object with illumination light directed through the window;
an imaging sensor having an array of photosensitive elements operative to capture an image of the target object during an exposure time period;
an NFC device being fixed at a position relative to the housing and operative to receive NFC signal from a mobile computing device, the NFC device including at least one NFC antenna configured to generate a voltage signal from magnetic induction of the NFC signal;
wherein the illumination system is operative to generate the illumination light that depends upon at least one of two conditions;
wherein, under a first condition that no NFC signal from the mobile computing device is received by the NFC device, the illumination system is configured to generate a first illumination light with a first intensity; and
wherein, under a second condition that the NFC signal from the mobile computing device is received by the NFC device, the illumination system is (1) configured to generate a second illumination light with a second intensity that is less than the first intensity at least during the exposure time period or (2) disabled from generating a second illumination light at least during the exposure time period.

17. The device of claim 16, further comprising:
a controller in the housing connected to the imaging sensor and the illumination system and operative to process a barcode in the image of the target object captured by the imaging sensor.

18. The device of claim 16, wherein the NFC device comprises an NFC antenna having conducting coils mounted behind the window.

19. The device of claim 16, wherein the NFC device comprises an NFC antenna having conducting coils wounded substantially parallel to the window.

20. The device of claim 16, further comprising:
an object sensor having an object field of view; and
wherein the NFC device is operative to establish NFC communication upon detecting the presence of an object within the object field of view of the object sensor.

* * * * *